United States Patent [19]

Wasserman et al

[11] Patent Number: 4,497,671
[45] Date of Patent: Feb. 5, 1985

[54] PROCESSED FERROUS METAL AND PROCESS OF PRODUCTION

[76] Inventors: Gary L. Wasserman, 4635 Private Lk. Dr. Birmingham, Mich. 48010; David J. Carter, 22620 E. River, Grosse Isle, Mich. 48138

[21] Appl. No.: 555,431

[22] Filed: Nov. 25, 1983

Related U.S. Application Data

[63] Continuation of Ser. No. 344,469, Feb. 1, 1982, abandoned.

[51] Int. Cl.$^3$ .............................................. C21D 1/48
[52] U.S. Cl. ...................................... 148/16; 148/20.3
[58] Field of Search ........................... 148/16, 14, 20.3

[56] References Cited

U.S. PATENT DOCUMENTS

| | | | |
|---|---|---|---|
| Re. 21,500 | 7/1940 | Rennerfelt | 75/28 |
| 1,491,392 | 4/1924 | Graham | 148/16 |
| 2,164,727 | 7/1939 | Westberg | 148/16 |
| 2,170,158 | 8/1939 | Rennerfelt | 148/16 |
| 2,201,181 | 5/1940 | Kalling | 148/16 |
| 2,435,946 | 2/1948 | Robiette et al. | 148/16 |
| 3,053,523 | 9/1962 | Shipley | 266/251 |
| 3,081,074 | 3/1963 | Blackman et al. | 432/199 |
| 3,196,054 | 7/1965 | Carpenter et al. | 148/16 |
| 4,272,306 | 6/1981 | Reisinger | 148/16 |
| 4,285,742 | 8/1981 | Bowes et al. | 148/16 |

OTHER PUBLICATIONS

Metals Handbook, 9th ed. vol. 1, Properties and Selection: Irons and Steels 1978, p. 140.

Primary Examiner—John P. Sheehan
Attorney, Agent, or Firm—Krass and Young

[57] ABSTRACT

Processed low carbon iron metal and process and apparatus for its production, using high water-vapordecarburization, are provided. The iron metal product is characterized by fine grain structure with average carbon content less than about 0.04%. The process is carried out using a cost beneficial protocol including the step of processing scrap steel segments at high density in a strongly decarburizing atmosphere.

7 Claims, 9 Drawing Figures

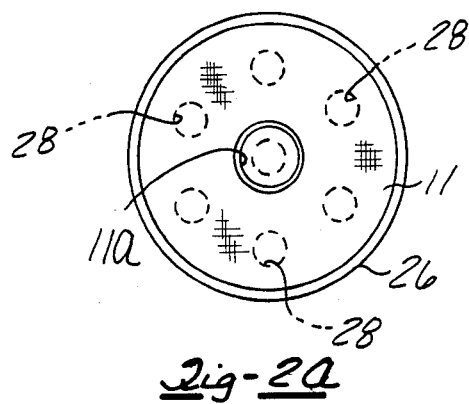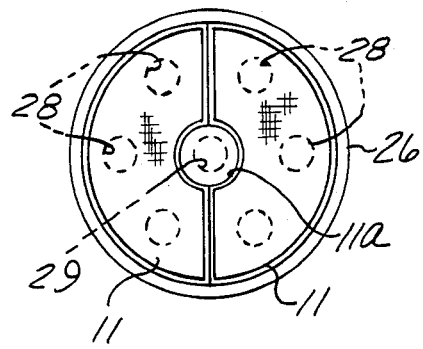
Fig-2a   Fig-2b
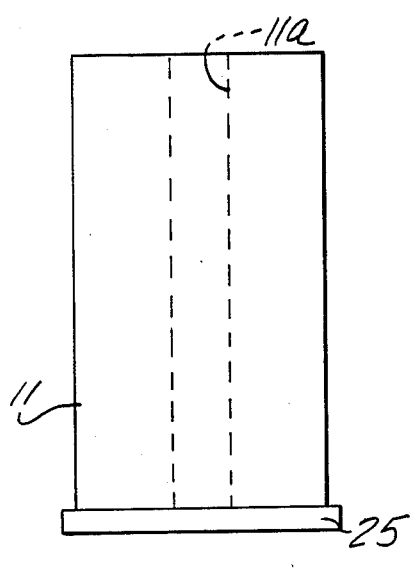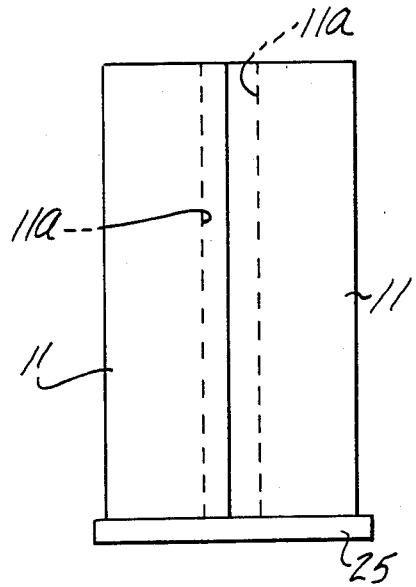
Fig-1a   Fig-1b

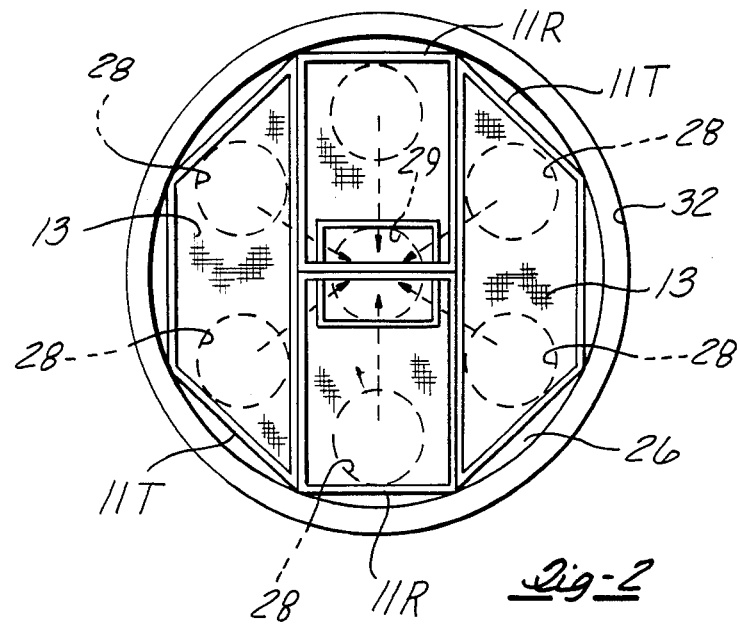
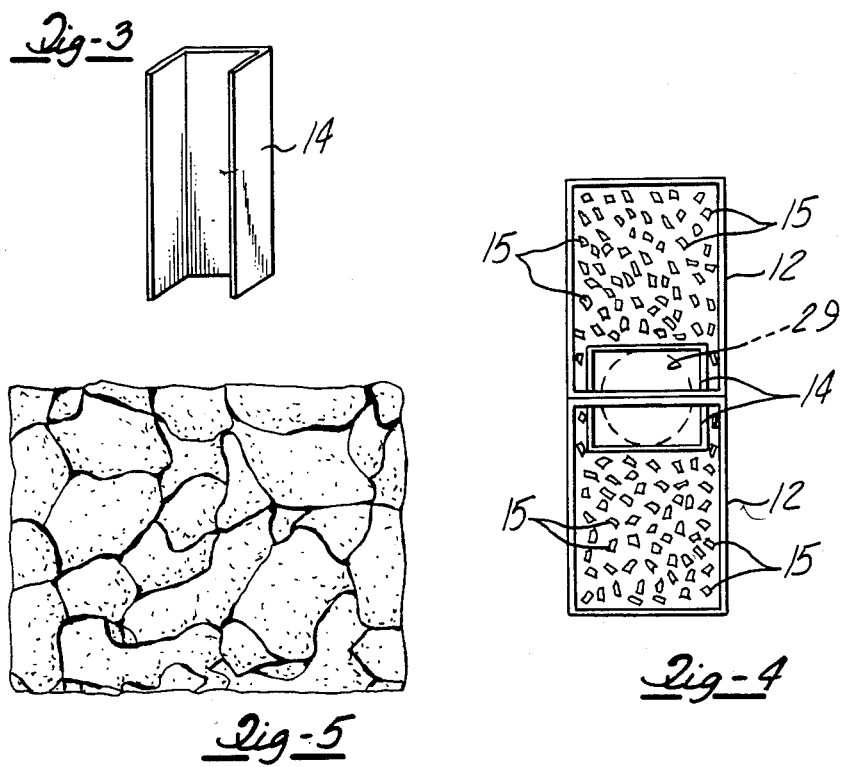

PROCESSED FERROUS METAL AND PROCESS OF PRODUCTION

This application is a continuation of application Ser. No. 344,469, filed 2-1-82 now abandoned.

DESCRIPTION

1. Technical Field

This invention relates to processed or refined low carbon ferrous metal segments and to process and apparatus for production of ferrous segments from steel.

2. Background Art

For the production of low carbon iron by decarburizing ferrous metal, it is known in the art to use particulate iron in the form of grains, granules, fine powder or flakes (U.S. Pat. No. Re. 21,500) or sheet iron such as coil sheet (U.S. Pat. Nos. 3,081,074 and 3,196,054). The decarburization is achieved in relatively short periods by a selective oxidizing action at furnace temperatures in a controlled atmosphere wherein the carbon content is lowered without substantial surface oxidation of the iron. The process using particulate iron suffers from disadvantages such as the high cost of subdividing the charge to the particle sizes required as well as the need for mobilizing or mixing the charge particulates during decarburization. The process using coil sheet is for practical purposes limited in its application to high tonnage loading in open coil form with attendant disadvantages such as correspondingly high cost. Further, the process times must be carefully monitored, being purposely kept short to minimize iron oxidation and unwanted growth in grain size of the stock.

It is therefore an object of the present invention to provide a new form of decarburized ferrous metal.

It is also an object of the invention to provide non-particulate core-decarburized ferrous metal.

It is a further object to provide means of converting scrap steel segments to soft ferrous metal of uniformly high quality and at relatively low cost.

It is another object of the invention to provide core-decarburized ferrous metal in quantity.

It is still another object to provide economical process and apparatus means for refining steel.

It is yet another object to provide means for producing quantities of soft ferrous metal suitable as high quality melt stock for specialty steel making and other purposes.

These and other objects, features and advantages will be realized from the following detailed description of the invention.

SUMMARY AND DETAILED DESCRIPTION

The invention in one aspect concerns a new form of core-decarburized ferrous metal. More particularly, the invention concerns refined core-decarburized non-particulate carbon-containing steel scrap segments. The ferrous segments of the invention have an average carbon content less than about 0.04% and preferably less than 0.03% by weight. The terms scrap or scrap segments, as used herein, based on the definition from Handbook of Terms Commonly Used in Steel and Non-Ferrous Industries, Iron Age Magazine, Chilton Publishing Co., Radnor, Pa., may be defined as ferrous discard or cuttings or junk ferrous metal which can be reprocessed, including but not limited to busheling, punchings, plate, slitter scrap, clips or other so-called offall. The term non-particulate segments refers to bodies or segments substantially larger than powder or flakes. The term core-decarburized refers to segments that are decarburized, according to the invention, both on the surface and to the core, that is substantially throughout the body of the segment, as opposed to conventional surface-decarburized prior art non-particulate ferrous metal. The latter non-particulate ferrous metal produced by conventional decarburizing methods typically contains substantially more than 0.06% by weight carbon.

The invention in another aspect concerns the production of ferrous metal or melt stock from non-particulate carbon-containing scrap steel segments. The process steps comprise establishing in the chamber or retort of an axial flow decarburizing atmosphere furnace annular container fixture means loaded with a gas-permeable array of the segments spatially distributed to accommodate uniform axial gas flow among the segments; subjecting the thus loaded segments to a decarburizing anneal cycle in a circulating high water-vapor decarburizing atmosphere at elevated temperatures peaking in the range from about 1300° to about 1650° F. such that on completion of the anneal cycle the segments are decarburized to the core of the segments and the average carbon content of the segments is reduced to less than about 0.04% and preferably less than 0.03%, by weight; and cooling and optionally melting the decarburized segments.

The invention in yet another aspect concerns container fixture apparatus for processing non-particulate steel segments in an axial flow decarburizing atmosphere furnace. The apparatus comprises annular open-ended container means adapted to hold a furnace charge of scrap segments and to maintain axial flow of the atmosphere through the container fixture means. In one preferred embodiment, the apparatus is a single layer open-ended annular fixture. In another embodiment, the fixture means is radially segmented or pie-shaped. In yet another embodiment, the fixture means is layered. In still another embodiment, the apparatus comprises a plurality of intermatching hollow open-ended container fixtures adapted to be aggregated side-by-side in even matching layers. The layers are adapted to be stacked fixture upon fixture and layer upon layer with the fixtures in each stack serving as a conduit allowing axial flow, preferably downward flow, of the atmosphere through the stack. The fixtures in each layer fit closely together, preferably in substantially leak proof relation, so that axial flow through the aggregated fixtures is kept inside, rather than escaping to the outside of the containers. Also, the distribution of the containers at each layer is even so that axial flow through these containers is uniform as to each portion or quadrant of the layer.

The description of the method and apparatus of the invention will be better understood when read in conjunction with the accompanying drawing showing preferred embodiments in which:

FIGS. 1a and 1b are views of similar container fixtures;

FIG. 2 is a top view of the assembly taken on lines 2—2 of FIG. 1;

FIGS. 2a and 2b are top views of the respective container fixtures of FIGS. 1a and 1b;

FIG. 3 is a perspective view of an atmosphere flow baffle fixture according to the invention, FIG. 4 is a top view of loaded container fixtures, and FIG. 5 is a facsimile micrograph of a metal specimen according to the invention.

Figure 1:
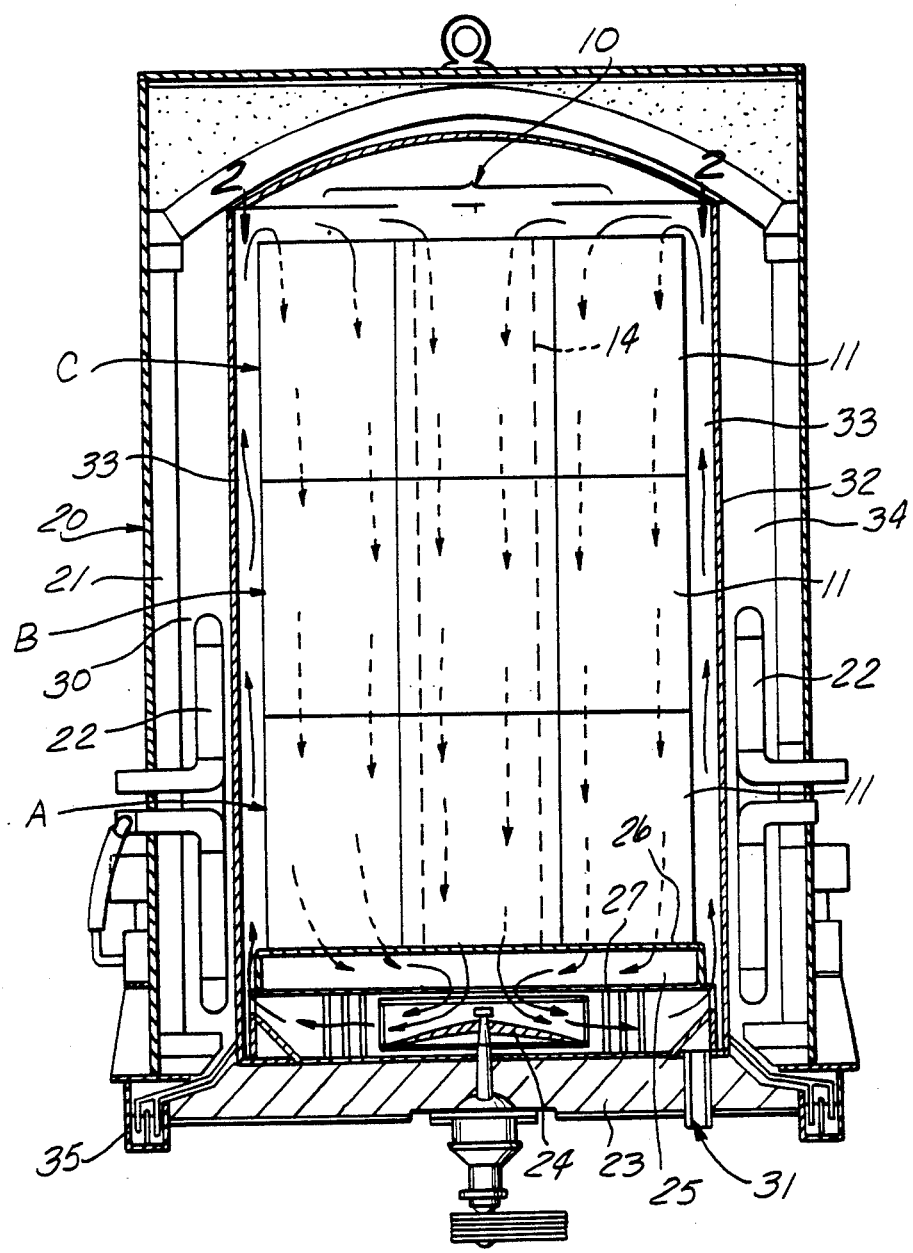
FIG. 1 is an illustrative plan view of an assembly of container fixtures according to the invention, in the chamber of a bell type closed atmosphere furnace shown in vertical cross-section.

Referring to FIGS. 1 and 2 of the drawing showing a preferred embodiment of the container fixtures, the assembly 10 of upright open-ended container fixtures 11 is made up of bottom A, middle B, and top C layers of uniform cross-section, in stacked relation. Each layer in turn includes matching or mirror-image pairs of quadrilateral container fixtures, one middle pair 11R rectilinear and the other outside pair 11T trapezoidal. The cooperating pairs 11R and 11T are configured to fit together side-by-side for a substantially gas-tight fit (as best seen in FIG. 2) such that forced convection gas flow through the furnace is tunneled downwardly inside, rather than outside, the fixtures. The fixtures are constructed with suitable durable material such as high temperature alloy metal and preferably stainless steel. The walls 12 are solid, that is imperforate, and the base 13 contains apertures for passage therethrough of gas, as presently to be described. Stainless steel screen is suitable material for the base. Thus the fixtures 11 serve not only as containers to structurally support the charge of metal materials to be decarburized in the furnace, but also, when assembled together, as sectional conduits or tunnels through which the downward flow of decarburizing gas is uniformly distributed section-wise during the process. There is no limit to minimum or maximum charge density. However, advantageously, the assembly of segment loaded fixtures accommodates a charge density, for example, from about 150 to about 250, and preferably about 180, pounds per cubic foot or higher. Surprisingly, it is found that the loaded array of segments is uniform and permeable throughout the assembly, for purposes of the invention. Also, the loaded segments advantageously do not require mobilizing or mixing during the decarburizing process. Another preferred container fixture embodiment seen in FIGS. 1a and 2a is an open-ended annular container 11 with an inside cylindrical wall 11a which is concentric with the top surface of the plenum top wall 26. Still another preferred container fixture embodiment seen in FIGS. 1b and 2b is an annular assembly of two matching open-ended container segments 11 adapted for axial flow registry with the inlet ports 28 of a plenum chamber 25.

The decarburizing furnace 20 (FIG. 1) is of a type described in the above-mentioned U.S. Pat. No. 3,081,074. It includes a furnace bell 21, radiant heating tubes 22, a base 23, a fan 24, and a plenum chamber 25 with plenum top wall 26 and bottom wall 27. The plenum top wall 26 contains plenum inlet ports 28 (as seen in dotted outline in FIG. 2) and the bottom wall contains a plenum outlet port 29.

The cylindrical zone 30 enclosed by the bell 21 and base 23 makes for confined high temperature heating of charges inside the bell. A closed-top congruent inner cover 32 defining a furnace chamber or retort 34 is provided in zone 30 for gas-tight fitting upon the base 23 by suitable means such as water/oil seal 35. The atmosphere can be controllably altered by introduction or withdrawal of gases at the inlet and outlet port 31. The furnace bell and cover each retract from the base and are lifted for purposes of loading and unloading furnace charges.

OPERATION

For operation of the furnace with the bell 21 and cover 32 retracted, the containers 11 are loaded with a furnace charge of scrap steel segments, the bell and cover are replaced, and the closed furnace is cycled through a pre-heat, a decarburizing soak, and finally steps of cooling, opening and unloading. For loading, according to a preferred embodiment of the invention, the containers of the middle pair 11R of each layer are each first fitted with a baffle fixture 14 (FIG. 3) positioned as illustrated in FIG. 2 so that when loaded with metal segments 15 as illustrated in FIG. 4 the load is spaced away from the axial center of the respective layer. All containers are then loaded, partly or fully as desired, with segments to provide in each fixture a uniformly gas-permeable array of the segments, it being understood that the steady state pressure drop through the depth of the bed should be substantially uniform for each and all fixtures, and for each stack of fixtures. In other words, the loading is such that the axial gas flow through the charge is even and uniform thereby avoiding channeling effects which would cause axially and radially spaced pockets or zones of uneven decarburization. Random loading of each fixture is ordinarily sufficient to achieve even distribution of the segments in the fixture. Nesting of the segments should be avoided where possible. The bottom layer A is then assembled on the plenum top wall 26 so that each fixture is tightly fitted against the others and is in registry with the respective plenum inlet ports 28. Next, the middle layer B and top layer C are each placed, in turn, in stacked fashion onto and in registry with its respective underlying layer to provide the complete assembly illustrated in FIG. 1.

Next, the cover 32 and bell 21 are replaced. The furnace is then cycled through pre-soak, soak and cooling phases. The cycle time is a function of furnace size, furnace power, charge weight and density, for example, as follows:

| Time, Hours | Phase | Temperature, Deg. F. |
| --- | --- | --- |
| 2 | Pre-soak | to 1300 |
| 20 | soak | at 1300 |
| 3 | cool | to 300 |

For the pre-soak phase, the chamber 33 is purged with dry nitrogen at 500 cubic feet per hour (CFH) for two hours while heating to 1300° F. The gas flow is accomplished under convection forced by the fan 24 which blows gas into the annular space 30 upwardly to the top of the container assembly 10 and then downwardly in axial downdraft fashion through the loaded container fixtures 11 to the plenum chamber 25 by way of the inlet ports 28 and radially inward to the plenum outlet 29 and fan 24, thus completing the convection flow cycle. For the soak phase at decarburizing temperature, given a chamber unit volume of about 80 cubic feet and average charge density of 165–180 pounds per cubic foot, the atmosphere is cycled in succession through a natural (DX) gas purge for one hour, a DX gas soak with steam injection for 18 hours, and a nitrogen purge for one hour. In particular, the DX gas purge is done at a flow rate of about 250 CFH and at low dewpoint, e.g., 60° F. or less. The DX gas soak is done at the same flow rate, first at low entering dewpoint followed by an increasing dewpoint, e.g., from 69° F. (2.5% $H_2O$ by volume) to about 85° F. exhaust dewpoint (4% H₂O by volume). The nitrogen purge is done at 500 CFH. A preferred decarburizing process gas is the so-called rich exothermic gas (Rich EXO: American Gas Association Class 102, air-to-DX gas ratio, about 6.5:1). Theoretical analysis of the soak atmosphere is the following: $H_2O$—2.5%, $H_2$—11%, $CO$—8.6%, $CO_2$—6.4%, $N_2$—balance. For the cooling phase, the retort is pulled, and the charge is moved to a cooling stand and cooled preferably at ambient temperature. In a preferred procedure, the cooling is carried out by subjecting the charge to a dry nitrogen purge at 250 CFH such that the charge is cooled to about 200° F. in three hours. The resulting ferrous metal segments according to the invention typically have the following maximum and preferred weight percent specifications:

|  | % (Max) | % (Preferred) |
| --- | --- | --- |
| Carbon | 0.04 | 0.009 |
| Sulphur | 0.025 | 0.014 |
| Phosphorus | 0.025 | 0.009 |
| Manganese | 0.4 | 0.28 |
| Silicon | 0.02 | 0.01 |

The invention is applicable broadly to steel scrap segments. The average carbon content will ordinarily be at least 0.05% by weight and preferably not more than about 0.2%. The segments can have any of a wide variety of shapes and sizes but generally expressed in terms of finished segments the width will be at least about one inch and the thickness at least about 0.062 gage. Especially if bulky or rigid, the segments will have a maximum dimension of about eight inches. Nesting of the segments ordinarily is not a problem. Desirably, the segments may be washed or degreased, and dried prior to decarburizing. Unlike the prior art surface-decarburized non-particulate ferrous metal, the segments decarburized according to the invention are unique, as indicated, in that each segment has a generally uniform carbon content. In other words, the carbon content is lowered not only at the surface but at the core and throughout the segment, the average being less than about 0.04%. The segments typically are soft and have the grain structure illustrated in FIG. 5 showing the micrograph of a core-decarburized product specimen of the process of the invention using 2% Nital etchant at 400X magnification. The segments thus have significant advantage as uniformly high quality melt stock for specialty steel making and other purposes. The invention contemplates melting the decarburized segments of the invention by means which may be conventional to obtain quality ingots, castings or other forms for remelting, re-rolling or other purposes.

While the invention has been described in detail, it will be realized by those skilled in the art that considerable variation can be made in such detail without departing from the spirit of the invention as hereinafter claimed.

I claim:

1. In the production of ferrous metal from carbon-containing non-particulate scrap steel segments, the steps comprising:
   establishing in the chamber or retort of an axial flow decarburizing atmosphere furnace a random loaded gas-permeable array of non-particulate scrap steel segments each having a maximum dimension of about eight inches and thus loaded being spatially distributed to accommodate uniform axial gas flow among the segments so as to avoid mobilizing or mixing of the loaded segments during decarburizing;
   subjecting the thus loaded segments to a decarburizing anneal cycle in a circulating high water-vapor decarburizing atmosphere at elevated temperatures peaking in the range from about 1300° to about 1650° F. such that on completion of the anneal cycle the segments are decarburized to the core of the segments and the average carbon content of the segments is reduced to less than about 0.04%;
   and cooling the decarburized segments.

2. A process according to claim 1 in which the anneal cycle includes sequential pre-soak and soak phases.

3. A process according to claim 2 in which the water vapor content of the atmosphere during the soak phase corresponds to about 2.5 to about 4% by volume.

4. A process according to claim 2 in which the charge density is at least about 165 pounds per cubic foot.

5. A process according to claim 2 in which the soak phase is carried out for at least about 18 hours.

6. A process according to claim 1 in which the cooling step is carried out at ambient temperature.

7. A process according to claim 6 in which the cooling step is carried out with an inert gas purge.

* * * * *